(12) United States Patent
Schardl, Jr. et al.

(10) Patent No.: US 7,745,527 B2
(45) Date of Patent: Jun. 29, 2010

(54) POLYETHYLENE-SYNDIOTACTIC POLYPROPYLENE COMPOSITION AND PROCESSING THEREOF

(75) Inventors: Joseph M. Schardl, Jr., Cypress, TX (US); Lu Ann Kelly, Friendswood, TX (US)

(73) Assignee: Fina Technology, Inc., Houston, TX (US)

( * ) Notice: Subject to any disclaimer, the term of this patent is extended or adjusted under 35 U.S.C. 154(b) by 762 days.

(21) Appl. No.: 11/639,898

(22) Filed: Dec. 15, 2006

(65) Prior Publication Data

US 2008/0143013 A1    Jun. 19, 2008

(51) Int. Cl.
*C08L 91/06*    (2006.01)
*C08F 110/06*   (2006.01)

(52) U.S. Cl. .................. 524/487; 524/232; 526/351

(58) Field of Classification Search ........... 526/351; 524/487, 232
See application file for complete search history.

(56) References Cited

U.S. PATENT DOCUMENTS

| | | | |
|---|---|---|---|
| 6,184,326 B1 | 2/2001 | Razavi | |
| 6,294,235 B1 | 9/2001 | Detoumay et al. | |
| 6,416,699 B1 | 7/2002 | Gownder et al. | |
| 6,433,103 B1 | 8/2002 | Guenther et al. | |
| 6,641,993 B1 | 11/2003 | Jacobs et al. | |
| 2006/0020067 A1 | 1/2006 | Brant et al. | |
| 2006/0211819 A1 | 9/2006 | Hoenig et al. | |

FOREIGN PATENT DOCUMENTS

WO    WO 99/10172    *  3/1999

* cited by examiner

*Primary Examiner*—Ling-Siu Choi
(74) *Attorney, Agent, or Firm*—Tenley R. Krueger

(57) ABSTRACT

A processable polypropylene composition comprising a mixture of a major amount of a syndiotactic polypropylene and a minor amount of polyethylene wax. The syndiotactic polypropylene has a designated recrystallization temperature, an original minor melting peak and a higher original melting peak. The polyethylene wax provides a recrystallization temperature of the mixture that is greater than the recrystallization temperature of the syndiotactic polypropylene alone and also provides for a minor melting peak and a major melting peak of the mixture, which has a temperature difference which is lower than the difference between the original minor melting peak and the original major melting peak of the syndiotactic polypropylene alone. A process for the production of polypropylene product employing a polyethylene-syndiotactic polypropylene composition as described which is heated to provide a plastic mass of the syndiotactic polypropylene and polyethylene which is processed to provide the product.

11 Claims, 1 Drawing Sheet

POLYETHYLENE-SYNDIOTACTIC POLYPROPYLENE COMPOSITION AND PROCESSING THEREOF

FIELD OF THE INVENTION

This invention relates to syndiotactic polypropylenes incorporating small amounts of polyethylene waxes and methods of processing such polypropylenes to produce a polypropylene product.

Stereoregular polypropylene in the form of propylene homopolymers or propylene co-polymers incorporating small amounts of other alpha olefins such as ethylene or butylene as co-monomers can be processed to form products such as films, fibers and molded products. Of the stereoregular polypropylenes, perhaps isotactic polypropylene is most widely used. For example, isotactic polypropylene can be used in the production of relatively thin films in which the polypropylene is heated and then extruded through slotted dies and subject to biaxial orientation by stretching the film in both a longitudinal and a transverse direction. Isotactic polypropylene can also be extruded through small orifices to produce fibers or may be subjected to blow molding or injected into constriction molds to produce molded products such as containers and solid shaped items.

The structure of isotactic polypropylene is characterized in terms of the methyl group attached to the tertiary carbon atoms of the successive propylene monomer units lying on the same side of the main chain of the polymer. That is, the methyl groups are characterized as being all above or below the polymer chain. Isotactic polypropylene can be illustrated by the following chemical formula:

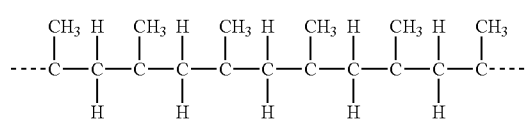

(1)

Stereoregular polymers, such as isotactic and syndiotactic polypropylene, can be characterized in terms of the Fisher projection formula Using the Fisher projection formula, the stereochemical sequence of isotactic polypropylene as shown by Formula (1) can be characterized as follows:

(2)

Another way of describing the structure is through the use of NMR. Bovey's NMR nomenclature for an isotactic pentad is ... mmmm ... with each "m" representing a "meso" dyad, or successive methyl groups on the same side of the plane of the polymer chain. As is known in the art, any deviation or inversion in the structure of the chain lowers the degree of isotacticity and crystallinity of the polymer.

In contrast to the isotactic structure, syndiotactic propylene polymers are those in which the methyl groups attached to the tertiary carbon atoms of successive monomeric units in the polymer chain lie on alternate sides of the plane of the polymer. Using the Fisher projection formula, the structure of syndiotactic polypropylene can be shown as follows:

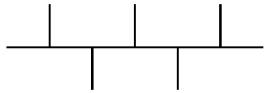

(3)

Syndiotacticity can be characterized in terms of the syndiotactic dyad and pentad rrrr in which each "r" represents a racemic dyad. Syndiotactic polymers are semi-crystalline and, like the isotactic polymers, are essentially insoluble in xylene. This crystallinity distinguishes both syndiotactic and isotactic polymers from an atactic polymer, which is non-crystalline and highly soluble in xylene. An atactic polymer exhibits no regular order of repeating unit configurations in the polymer chain and forms essentially a waxy product.

SUMMARY OF THE INVENTION

In accordance with the present invention, there is provided a processable polypropylene composition comprising a mixture of a syndiotactic polypropylene as the predominant component and a polyethylene wax as a relatively minor component. The syndiotactic polypropylene is characterized by a designated recrystallization temperature, an original minor melting peak, and an original major melting peak occurring at a higher temperature than the original minor melting peak. The polyethylene wax is present in an admixture with the syndiotactic polypropylene in an amount to provide a recrystallization temperature of the admixture that is greater than the recrystallization temperature of the syndiotactic polypropylene alone. The polyethylene wax also provides for a minor melting peak and a major melting peak of the mixture, which has a temperature difference which is lower than the temperature difference between the original minor melting peak and the original major melting peak of the syndiotactic polypropylene alone. In an embodiment, the temperature difference between the minor and major melting peaks of the formulation incorporating the polyethylene wax is less than the difference between the original minor and major melting peaks, that is, without the addition of the polyethylene wax, by an increment of at least 2° C. In an embodiment, the polyethylene wax, which has a molecular weight that is less than the molecular weight of the syndiotactic polypropylene, is present in an amount to provide an enhancement in the recrystallization temperature that is at least 5% greater than the recrystallization temperature of the syndiotactic polypropylene alone.

The processable polypropylene composition of the present invention is also characterized in terms of the slope of the curve defined by the original minor melting peak of the syndiotactic polypropylene alone and the minor melting peak of the admixture of polyethylene wax and the syndiotactic polypropylene. This slope is greater than the slope of the curve defined by the original major melting peak of the syndiotactic polypropylene and the major melting peak of the admixture of syndiotactic polypropylene and the polyethylene wax.

In an embodiment of the invention, the processable composition is characterized in terms of the temperature difference between the recrystallization temperature of the mixture and the minor melting peak of the mixture, which is less than the difference between the original recrystallization temperature and the original minor melting peak by an increment of at least 1° C. In another embodiment, the polyethylene wax is present in the admixture in an amount of at least 0.1 wt. % and ranging up to 10 weight percent to provide an amount within the range of 0.1-10 wt. %.

In another embodiment of the invention, there is provided a process for the production of a polypropylene product employing a polyethylene-syndiotactic polypropylene composition as described above. The polyethylene-syndiotactic polypropylene composition is heated to a temperature in excess of the major melting peak of the composition to provide a plastic mass of the syndiotactic polypropylene incorporating a small amount of polyethylene. This plastic mass is processed to a desired configuration to provide a preform for the product and then cooled to a temperature below the recrystallization temperature of the admixture to provide the product. The plastic mass may be processed by extruding it through a slotted die system to provide a polypropylene film. In another embodiment of the invention, the plastic mass may be blow molded or introduced into a confining mold and then cooled to a temperature below the recrystallization temperature to produce a molded product, or the plastic mass may be extruded through a fiber die orifice to produce an elongated fiber preform. The preform is then cooled to a temperature below the recrystallization temperature and then stressed by elongation to form the final fiber product.

DETAILED DESCRIPTION OF THE INVENTION

Figure 1:
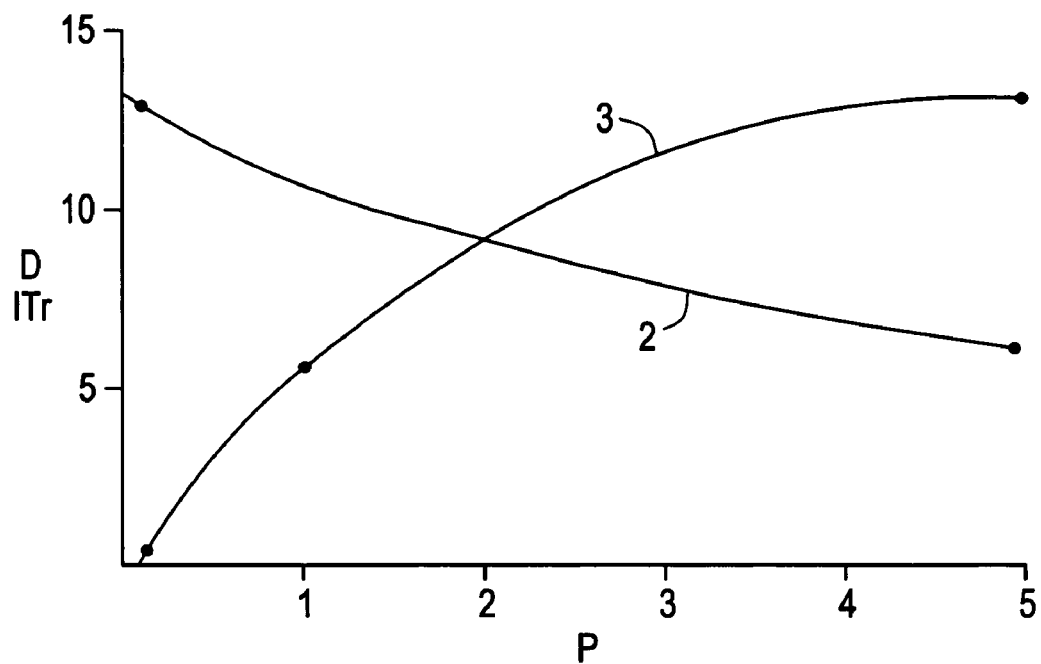
FIG. 1 is a graphical illustration of increase in recrystallization temperature and decrease in incremental difference between minor and major melting peaks as a function of polyethylene wax concentration in syndiotactic polypropylene.

The syndiotactic polypropylene employed in carrying out the present invention can be characterized in terms of the microcrystalline characteristics and the rheological properties that are significant in the processability of the polymer product. The microstructure and rheological products of syndiotactic polypropylene are described in U.S. Pat. No. 6,184,326 to Razavi et al. As disclosed there, syndiotactic polypropylene can be characterized in terms of its molecular weight and molecular weight distribution, $M_w/M_n$, as defined by the ratio of the weight average molecular weight, $M_w$, to the number average molecular weight, $M_n$, and it microstructure in terms of the percent of racemic dyads, indicated by r, racemic triads, indicated by rr, and racemic pentads, indicated by rrrr. As further described in the patent to Razavi et al., propylene can be polymerized to produce syndiotactic polypropylene to peak temperatures characterized in terms of a lower melting point, identified as Tm1, and a higher melting point, identified as Tm2 in the Razavi patent. For a further description of syndiotactic polypropylene, its microstructure, rheologic characteristics and melting point characteristics, reference is made to the aforementioned U.S. Pat. No. 6,184, 326, the entire disclosure of which is incorporated herein by reference.

The syndiotactic polypropylene employed in the present invention may have a relatively high syndiotacticity as measured by the percent of the racemic pentads of the syndiotactic polypropylene. In an embodiment, the microstructure is characterized by at least 70% racemic pentads, and more specifically at least 75% racemic pentads and further at least 80% racemic pentads. The molecular weight of the syndiotactic polypropylene employed in the present invention can be of any suitable value, but it normally will be substantially higher than the polyethylene wax that is mixed with the syndiotactic polypropylene. The molecular weight distribution may be broad or narrow, depending upon the ultimate use to which the polymer is put. The molecular weight distribution can be controlled by selection of the particular transition metal used in the syndiospecific catalyst or through the use of two different syndiospecific metallocenes as disclosed in the aforementioned U.S. Pat. No. 6,184,326 to Razavi et al.

The polyethylene wax incorporated into the syndiotactic polypropylene normally will be present in an amount of at least 0.1 wt. %, and alternatively in an amount of at least 1 wt. %. The polyethylene wax concentration may vary up to a value of about 10 wt. % of the syndiotactic polypropylene, but normally will be used in somewhat lower amounts of about 1 wt. %. As described previously and as shown by the following experimental work, the amount of syndiotactic polypropylene can be varied in order to produce a desired rheological characteristic of the syndiotactic polypropylene-polyethylene wax mixture. The polyethylene wax as described previously will normally have a substantially lower molecular weight than the molecular weight of the syndiotactic polypropylene. Normally the molecular weight of the polyethylene wax will be no more than 5,000. Usually the molecular weight will vary within the range of 1,000-3,000.

In processing the syndiotactic polypropylene-polyethylene wax mixture, the solid polymer product, as it is progressively heated, reaches a first lower temperature melting peak, characterized herein as the minor melting peak, and upon further heating reaches a second, higher temperature melting peak, characterized herein as the major melting peak. As the molten polymer product is then cooled, it reaches a recrystallization peak that is at a temperature significantly below the temperature of the minor melting peak. In the present invention, the processing of the syndiotactic polypropylene-polyethylene wax mixture can be controlled and enhanced by bringing the minor and major melting peaks in closer proximity to one another than observed for the pure syndiotactic polypropylene and also by increasing the recrystallization peak to a value greater than that observed for the original or pure syndiotactic polypropylene, that is, the polypropylene without the addition of the polyethylene wax.

In experimental work respecting the invention, four samples of a syndiotactic polypropylene were tested with respect to their rheological properties as characterized by their minor and major melting peaks and their recrystallization temperatures. The three samples incorporated a polyethylene wax in various concentrations, and one sample comprised only the syndiotactic polypropylene without the polyethylene wax addition.

The syndiotactic polypropylene employed in the experimental work was highly crystalline, having >90% syndiotactic dyads and >75% syndiotactic pentads. The syndiotactic polypropylene was produced by polymerization with a syndiospecific metallocene of the type disclosed in the aforementioned U.S. Pat. No. 6,184,326. The polymer had a weight average molecular weight of about 170,000 and a number average molecular weight of about 35,000, providing a molecular weight distribution of 4.8.

The polyethylene wax employed in various concentrations in admixture with the syndiotactic polypropylene had a molecular weight of about 3,000 and a melting temperature of about 128° C. The polyethylene wax was employed in compositions varying from 0.1 wt. % polyethylene wax to 5.0 wt. % polyethylene wax. The percentage of polyethylene wax is determined based upon the mixture of the polyethylene and syndiotactic polypropylene. Thus, the formulation containing 5.0 wt. % polyethylene incorporated 5 parts by weight of polyethylene and 95 parts by weight of syndiotactic polypropylene.

The polyethylene wax employed was employed in two forms. One was a micronized form having an average particle size of 7 microns, and the other in the form of prills averaging 200 micron particles. The pure syndiotactic polypropylene and the polyethylene-syndiotactic polypropylene formulations were formed into plaques having a thickness of 0.05". The characteristics of the formulations and the plaques thus formed are set forth in Table I. In Table I, the four samples used are identified as samples 1, 2, 3 and 4, with sample 1 being the pure polypropylene. Column no. 1 indicates the concentration of polyethylene wax and column no. 2 indicates the nature of the wax used in the sample in question. In the third column, the haze of the 0.05 inch plaques is set forth. The haze factor was determined according to ASTM Method D1003 (Procedure A). The fourth column sets forth the relative injection speed in forming the plaques and the fifth column indicates the cooling time for the plaques in seconds. The sixth column shows the total cycle time for producing the plaques in seconds.

Table II presents the rheological properties of the four samples identified in Table I. In Table II, the recrystallization temperature, $T_r$, and the major, $T_1$, and minor, $T_2$ temperature peaks in ° C. are shown respectively in the first three rows of data. The fourth row indicates the difference between the major ($T_1$) and the minor ($T_2$) melting peaks for each of the samples 1, 2, 3 and 4. The fifth row indicates the difference between $T_2$ and $T_r$ and the last row indicates the difference between $T_1$ and $T_r$.

TABLE I

| Sample | 1 | 2 | 3 | 4 | 5 | 6 |
|---|---|---|---|---|---|---|
| 1 | | | 9.5 | 75 | 60 | 81.5 |
| 2 | 0.1% | micronized, avg. 7 micron particles | 13.0 | 69 | 80 | 103.3 |
| 3 | 1.0% | micronized, avg. 7 micron particles | 9.4 | 69 | 80 | 101.6 |
| 4 | 5.0% | prill, avg. 200 micron particles | 63.7 | 69 | 60 | 81.6 |

TABLE II

| | 1 | 2 | 3 | 4 |
|---|---|---|---|---|
| $T_r$ | 69.9 | 70.4 | 75.3 | 82.8 |
| $T_1$ | 129.5 | 128.5 | 129.1 | 129.1 |
| $T_2$ | 116.6 | 115.5 | 118.3 | 122.8 |
| $T_1 - T_2$ | 12.9 | 13 | 10.8 | 6.3 |
| $T_2 - T_r$ | 46.7 | 45.1 | 43 | 40 |
| $T_1 - T_r$ | 59.6 | 58.1 | 53.8 | 46.3 |

Figure 2:
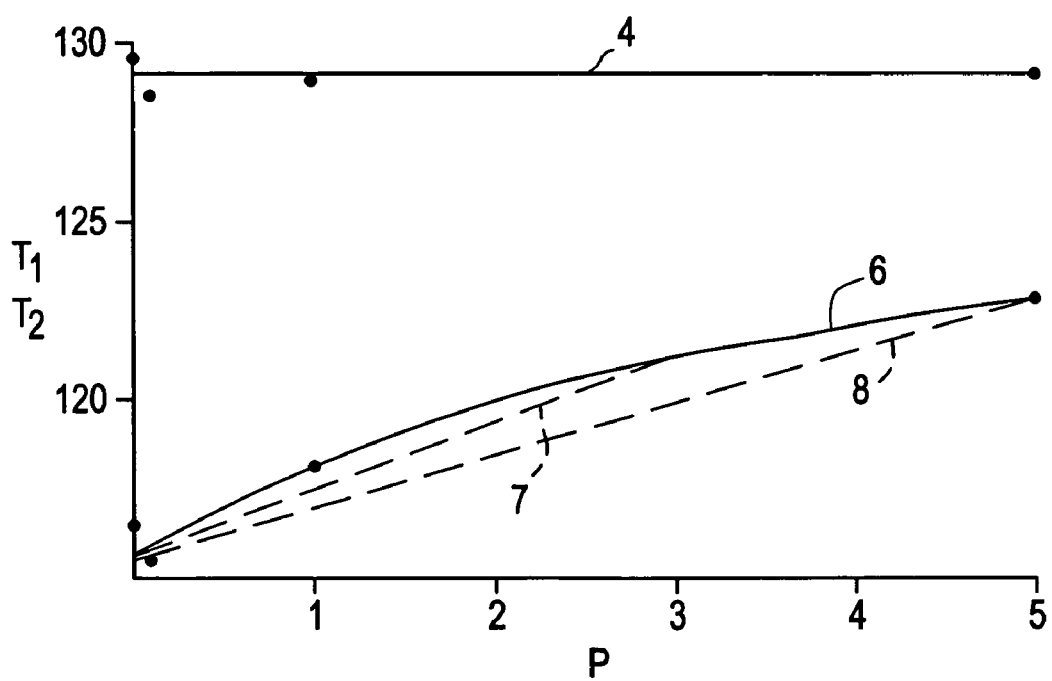
FIG. 2 is a graphical illustration of the major melting peak and the minor melting peak as a function of the polyethylene wax concentration in the syndiotactic polypropylene mixture.

Certain of the data set forth in Table II are shown graphically in FIGS. 1 and 2. In FIG. 1, curve 2 is a plot of the incremental difference D between the major and minor melting peaks ($T_1$-$T_2$) in ° C. plotted on the ordinate vs. the polyethylene concentration, P, plotted on the abscissa and curve 3 is a graph of the increase in recrystallization temperature $IT_r$ from the value of $T_r$ for sample 1 plotted on the ordinate vs. the polyethylene concentration, P.

In FIG. 2, curve 4 is a plot of the major melting peak, $T_1$, plotted on the ordinate vs. the polyethylene concentration, P, plotted on the abscissa. Curve 6 is a plot of the minor melting peak, $T_2$, plotted on the ordinate vs. the polyethylene concentration, P, plotted on the abscissa. In reviewing the experimental work, it appears that the initial slight decrease in $T_1$ and $T_2$ may be an anomaly resulting from experimental error and accordingly, curves 4 and 6 in the graph are drawn through an average of the data for the syndiotactic polypropylene alone and the syndiotactic polypropylene containing 0.1 wt. % polyethylene.

As can be seen from examination of the above-referenced experimental work, the addition of even a small amount of polyethylene wax has several beneficial results in terms of enhancing processability of the syndiotactic polypropylene during formation of the initial preform and during processing to produce the desired product. A significant increase in recrystallization temperature is observed, along with an increase in the minor melting peak. The major melting peak remains more or less flat, with an increase in polyethylene concentration so that the two melting peaks tend to merge, enhancing processability of the syndiotactic polypropylene during formation of the preform. At least 1 wt. % polyethylene wax may be employed in order to achieve a significant increase in recrystallization peak along with substantial merging of the major and minor melting peaks. As indicated by the data shown in FIG. 1 where curves 2 and 3 reach a crossover point near 2 wt. %, at least 2 wt. % polyethylene wax is employed in order to provide a mixture at or above this crossover point.

As shown by the data in FIG. 2, the increase in the minor melting peak, as indicated by curve 6, continues through the 5 wt. % polyethylene formulation, albeit with a decreasing slope. Accordingly, while greater amounts of polyethylene can be employed, up to 10 wt. %, the polyethylene content may be limited to 5 wt. %, and alternatively limited to 4 wt. % in order to prevent further degradation of clarity of the product as indicated by the increased haze factor shown in Table I. In FIG. 2, broken lines 7 and 8 indicate the slope of the curve defined by the original minor melting peak of the syndiotactic polypropylene alone and the peaks as observed at 2 and 5 wt. %, respectively. In both cases, they are substantially greater than the slope of curve 4, which is relatively flat.

The syndiotactic polypropylene-polyethylene wax mixture may be employed in accordance with the present invention to produce any suitable product. Thus, the invention may be carried out to produce fibers, monolayer or multilayer films and molded products in either blow molding processes or constrictive molding processes. In each case, the polyethylene-syndiotactic polypropylene composition is heated to a temperature in excess of the major melting peak to produce a molten or plastic mass of the composition, which can be further processed to a desired configuration. The preform thus produced is then cooled to a temperature below the recrystallization temperature to provide the desired product. This product may be further processed in a manner known to those skilled in the art in order to arrive at the desired product.

The present invention is particularly applicable to the production of polypropylene films and fibers. Suitable procedures for producing fibers formed of the polyethylene wax-syndiotactic polypropylene composition of the present invention are disclosed in U.S. Pat. No. 6,416,699 to Gownder. As disclosed in Gownder, the syndiotactic polypropylene formulation is heated to a molten state, in this case in excess of the major melting temperature peak, and then extruded to form a fiber preform which is spun in a quench column and then drawn at any suitable draw ratio, typically within the range of 2-3.

Where the present invention is employed in the production of polypropylene films, the molten mass, again heated to a temperature in excess of the major melting point peak, is extruded through a slotted die configuration and then processed, for example, in a suitable tenter frame procedure as disclosed in U.S. Pat. No. 6,641,913 to Hanyu et al. The polyethylene wax-syndiotactic polypropylene formulation of the present invention may be used to form monolayer films, but typically will be used in multilayer films where the polyethylene-wax syndiotactic polypropylene film may be used to form a surface layer. For a further description of the application of the present invention in producing fibers and film products, reference is made to the aforementioned U.S. Pat. Nos. 6,416,699 to Gownder and U.S. Pat. No. 6,641,993 to Hanyu et al., the entire disclosures of which are incorporated herein by reference.

The polyethylene wax syndiotactic polypropylene formulation of the present invention can also be employed in various molding operations that may take the form of blow molding operations or constricted molding operations. In blow molding, the plastic polyethylene-syndiotactic polypropylene composition is extruded through a suitable feed structure into a mold cavity of suitable configuration while attendantly supplying air or another gas so that the plastic syndiotactic polypropylene formulation is formed to a desired configuration within the mold structure. Blow molding can be employed to produce hollow products of any suitable configuration, such as bottles as disclosed in U.S. Pat. No. 6,433,103 to Gunther et al. or automobile fuel tanks as disclosed in U.S. Pat. No. 6,294,235 to Detoumay et al. For a description of blow molding techniques that may be used in carrying out the present invention, reference is made to the aforementioned U.S. Pat. No. 6,294,235 to Detoumay and U.S. Pat. No. 6,433,103 Gunther et al., the entire disclosures of which are incorporated herein by reference. In producing molded products by constricted molding the shape of the product is formed by the geometry of the mold without the attendant introduction of a pressurizing gas.

Having described specific embodiments of the present invention, it will be understood that modifications thereof may be suggested to those skilled in the art, and it is intended to cover all such modifications as fall within the scope of the appended claims.

The invention claimed is:

1. A processable polypropylene composition comprising a mixture of:
    (a) a predominate amount of a syndiotactic polypropylene having a designated recrystallization temperature and an original minor melting peak and an original major melting peak; and
    (b) no more than 10 wt. % of polyethylene wax in admixture with said syndiotactic polypropylene in an amount sufficient to provide a recrystallization temperature of said admixture greater than the designated recrystallization temperature of said syndiotactic polypropylene and a minor melting peak and major melting peak having a temperature difference which is lower than the temperature difference between said original minor melting peak and said original major melting peak.

2. The composition of claim 1 wherein said polyethylene wax is present in said formulation in an amount to provide an enhancement in the recrystallization temperature of said formulation which is at least 5% greater than the recrystallization temperature of said syndiotactic polypropylene without the addition of said polyethylene wax.

3. The composition of claim 1 wherein the temperature difference between the major and minor melting peaks of said formulation incorporating said polyethylene wax is less than the temperature difference between the original major and minor peaks without the addition of said polyethylene wax by an increment of at least 1° C.

4. The composition of claim 1 wherein said polyethylene wax has a molecular weight that is less than the molecular weight of said syndiotactic polypropylene.

5. The composition of claim 4 wherein said polyethylene wax has a molecular weight of no more than 5,000.

6. The composition of claim 5 wherein the temperature difference between the minor and major melting temperatures of said composition incorporating said polyethylene wax is less than the temperature difference between the original minor and major melting temperatures without the addition of said polyethylene wax by an increment of at least 2° C.

7. The composition of claim 1 wherein said syndiotactic polypropylene has a syndiotacticity as measured by the percent racemic pentads of said syndiotactic polypropylene of at least 70%.

8. The composition of claim 1 wherein the slope of the curve defined by the original minor melting peak of said syndiotactic polypropylene and the minor melting peak of said admixture of polyethylene wax and said syndiotactic polypropylene is greater than the slope of the curve defined by the original major melting peak of said syndiotactic polypropylene and the major melting peak of said admixture of polyethylene wax and said syndiotactic polypropylene.

9. The composition of claim 1 wherein the temperature difference between the recrystallization temperature of said mixture and the minor melting peak of said mixture is less than the difference between said original recrystallization and said original minor melting peak by an increment of at least 1° C.

10. The composition of claim 1 wherein said polyethylene wax is present in said admixture in an amount of at least 1 wt. %.

11. A processable polypropylene composition comprising a mixture of:
    (a) a predominate amount of a syndiotactic polypropylene having a designated recrystallization temperature and an original minor melting peak and an original major melting peak; and
    (b) no more than 10 wt % of polyethylene wax in admixture with said syndiotactic polypropylene in an amount sufficient to provide a recrystallization temperature of said admixture greater than the designated recrystallization temperature of said syndiotactic polypropylene and a minor melting peak and major melting peak having a temperature difference which is lower than the temperature difference between said original minor melting peak and said original major melting peak and wherein the polyethylene wax exhibits a molecular weight of from about 1000 to about 3000.

* * * * *